US011915591B2

(12) United States Patent
Cha et al.

(10) Patent No.: US 11,915,591 B2
(45) Date of Patent: Feb. 27, 2024

(54) METHOD OF AVOIDING COLLISION OF VEHICLES AT INTERSECTION AND SYSTEM PERFORMING THE SAME

(71) Applicant: Chemtronics Co., Ltd., Sejong (KR)

(72) Inventors: Jin Cha, Seongnam-si (KR); Seung Hyun Jang, Seongnam-si (KR); Tae Jeong Jeong, Seongnam-si (KR)

(73) Assignee: CHEMTRONICS CO., LTD., Sejong (KR)

( * ) Notice: Subject to any disclaimer, the term of this patent is extended or adjusted under 35 U.S.C. 154(b) by 565 days.

(21) Appl. No.: 17/253,971

(22) PCT Filed: Jan. 16, 2019

(86) PCT No.: PCT/KR2019/000625
§ 371 (c)(1),
(2) Date: Dec. 18, 2020

(87) PCT Pub. No.: WO2019/245124
PCT Pub. Date: Dec. 26, 2019

(65) Prior Publication Data
US 2021/0272460 A1  Sep. 2, 2021

(30) Foreign Application Priority Data

Jun. 21, 2018 (KR) .................. 10-2018-0071697
Dec. 27, 2018 (KR) .................. 10-2018-0170540

(51) Int. Cl.
*G08G 1/16* (2006.01)
*B60W 30/09* (2012.01)
(Continued)

(52) U.S. Cl.
CPC ............. *G08G 1/162* (2013.01); *B60W 30/09* (2013.01); *B60W 30/0956* (2013.01);
(Continued)

(58) Field of Classification Search
CPC ............... B60W 30/09; B60W 30/095; B60W 30/0956; B60W 30/18154;
(Continued)

(56) References Cited

U.S. PATENT DOCUMENTS

2003/0220728 A1* 11/2003 Rao ................ B60R 21/013
340/436
2018/0018878 A1* 1/2018 Kitano ................ G08G 1/167
(Continued)

FOREIGN PATENT DOCUMENTS

KR 2011-0097091 A 8/2011
KR 2014-0121544 A 10/2014
(Continued)

OTHER PUBLICATIONS

International Search Report PCT/ISA/210 for International Application No. PCT/KR2019/000625 dated Apr. 24, 2019.

*Primary Examiner* — Anshul Sood
(74) *Attorney, Agent, or Firm* — Harness, Dickey & Pierce, P.L.C.

(57) ABSTRACT

A vehicle collision avoidance method includes receiving host vehicle driving information, receiving remote vehicle driving information, generating a host vehicle position function and a remote vehicle position function, setting a transformation coordinate system, calculating a rotation angle, transforming the host vehicle position function and the remote vehicle position function to a transformed host vehicle position function and a transformed remote vehicle position function, respectively, using the rotation angle, determining a collision possibility between the host vehicle and the remote vehicle using the transformed host vehicle position function and the transformed remote vehicle position function, and controlling the host vehicle depending on the collision possibility.

10 Claims, 9 Drawing Sheets

(51) Int. Cl.
 *B60W 30/095* (2012.01)
 *B60W 30/18* (2012.01)
(52) U.S. Cl.
 CPC ............. *B60W 30/18154* (2013.01); *B60W 30/18159* (2020.02); *G08G 1/166* (2013.01); *B60W 2520/06* (2013.01); *B60W 2552/05* (2020.02); *B60W 2554/4041* (2020.02); *B60W 2554/4043* (2020.02); *B60W 2554/4044* (2020.02); *B60W 2554/801* (2020.02); *B60W 2554/802* (2020.02); *B60W 2556/65* (2020.02)
(58) Field of Classification Search
 CPC ........ B60W 30/18159; B60W 2556/45; G08G 1/096725; G08G 1/096766; G08G 1/161; G08G 1/166
 See application file for complete search history.

(56) References Cited

U.S. PATENT DOCUMENTS

2018/0096597 A1 4/2018 Mortazavi et al.
2018/0345958 A1* 12/2018 Lo ................... G08G 1/096725

FOREIGN PATENT DOCUMENTS

| KR | 2016-0071161 A | 6/2016 |
| KR | 2017-0007925 A | 1/2017 |

* cited by examiner

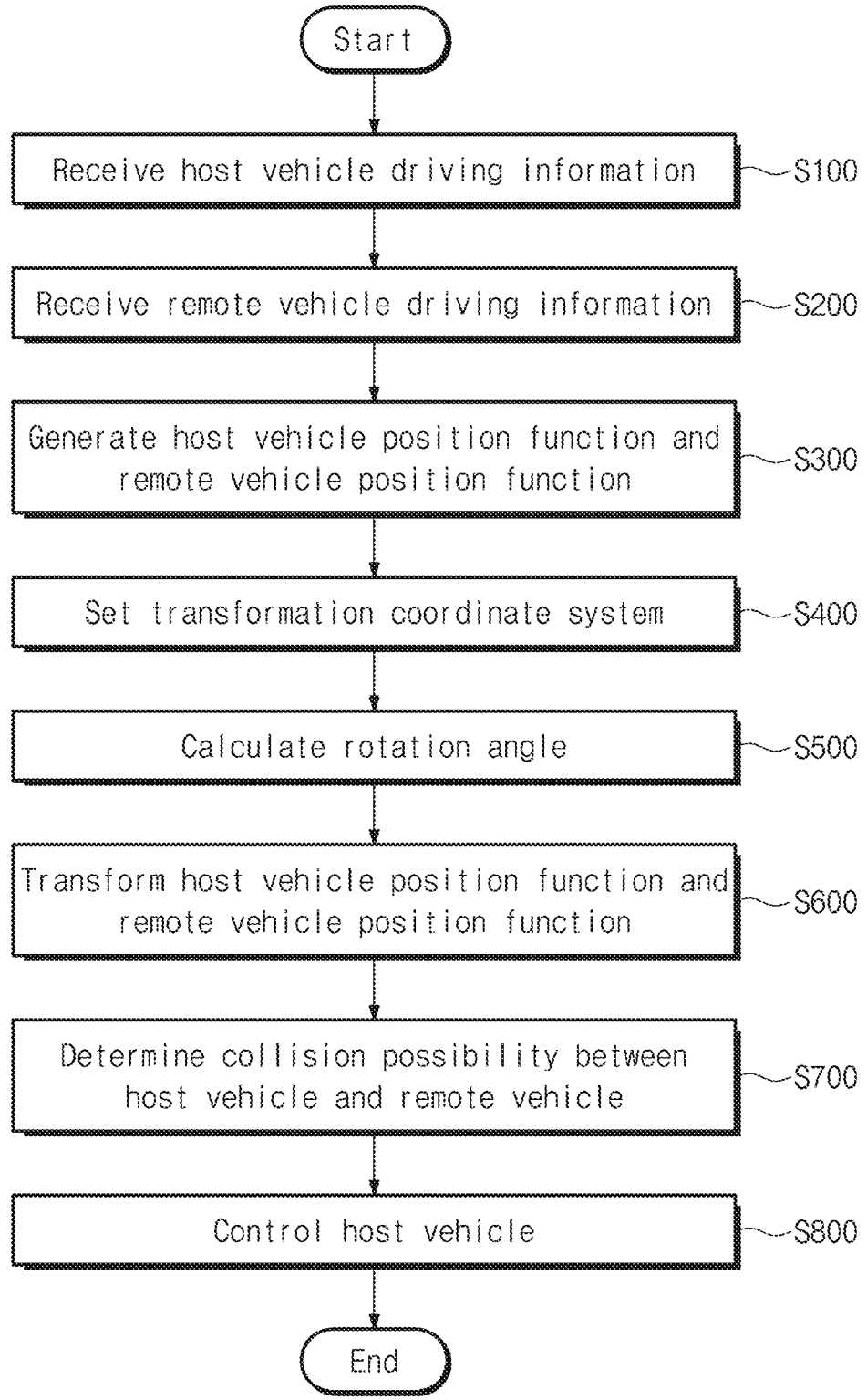

METHOD OF AVOIDING COLLISION OF VEHICLES AT INTERSECTION AND SYSTEM PERFORMING THE SAME

CROSS-REFERENCE TO RELATED APPLICATIONS

This application is a national phase under 35 U.S.C. § 371 of PCT International Application No. PCT/KR2019/000625 which has an International filing date of Jan. 16, 2019, which claims priority to Korean Patent Application No. 10-2018-0170540, filed Dec. 27, 2018, and Korean Patent Application No. 10-2018-0071697, filed Jun. 21, 2018, the entire contents of each of which are hereby incorporated by reference.

BACKGROUND

1. Field of Disclosure

The present disclosure relates to a method of avoiding a collision of vehicles at an intersection and a system performing the same.

2. Description of the Related Art

In recent years, various researches are being carried out to integrate the information technology into vehicles. In combining the vehicles and the information technology with each other, one of the important factors is a technology that collects and processes information on the vehicles. For instance, accurately collecting and processing the information, such as vehicle speed, vehicle position, etc., generated while the vehicles are running, is highly important when integrating the information technology and the vehicles.

The importance of the technology that collects and processes the vehicle information is becoming increasingly prominent as the convergence of the vehicles and the information technology progresses. As an example, in the case where an important part of driving a vehicle is entrusted to information technology, e.g., autonomous vehicle, it is highly important to collect and process vehicle information precisely and quickly.

In the case of automated driving, since new vehicle information are generated with the running of the vehicle in real time and the generated data are processed to control the vehicle, it is important to process the data rapidly.

SUMMARY

The present disclosure provides a method of avoiding collisions between vehicles entering an intersection by immediately detecting positions of remote vehicles while driving.

Embodiments of the inventive concept provide a vehicle collision avoidance method including receiving host vehicle driving information including position coordinates and a driving direction of a host vehicle, receiving remote vehicle driving information including position coordinates and a driving direction of a remote vehicle, generating a host vehicle position function and a remote vehicle position function based on the host vehicle driving information and the remote vehicle driving information, setting a transformation coordinate system with respect to the position coordinates of the host vehicle, calculating a rotation angle that is an angle between the driving direction of the host vehicle and one axis of the transformation coordinate system, transforming the host vehicle position function and the remote vehicle position function to a transformed host vehicle position function and a transformed remote vehicle position function, respectively, using the rotation angle, determining a collision possibility between the host vehicle and the remote vehicle using the transformed host vehicle position function and the transformed remote vehicle position function, and controlling the host vehicle depending on the collision possibility.

The transformed host vehicle position function and the transformed remote vehicle position function are generated by rotating the host vehicle position function and the remote vehicle position function by the rotation angle based on a position of the host vehicle as an origin.

The host vehicle and the remote vehicle are vehicles approaching an intersection, the intersection includes a first road on which the host vehicle drives and a second road on which the remote vehicle drives, and the vehicle collision avoidance method includes determining whether an intersection angle of the first road and the second road is within an effective intersection range and transforming the remote vehicle position function and the host vehicle position function to the transformed remote vehicle position function and the transformed host vehicle position function, respectively, when the intersection angle is within the effective intersection range.

The vehicle collision avoidance method further includes modifying the second road such that the first road is substantially perpendicular to the second road when the intersection angle is within the effective intersection range before the transforming of the remote vehicle position function to the transformed remote vehicle position function. When a distance between the host vehicle and the remote vehicle is equal to or smaller than a predetermined value, the remote vehicle position function and the host vehicle position function are transformed to the transformed remote vehicle position function and the transformed host vehicle position function, respectively, even though the intersection angle is out of the effective intersection range.

The host vehicle and the remote vehicle are vehicles approaching an intersection, the intersection includes a first road on which the host vehicle drives and a second road on which the remote vehicle drives, and the vehicle collision avoidance method further includes obtaining a distance variation value that is a difference between a distance between the host vehicle and the remote vehicle before the second road is modified to allow the intersection angle to be about 90 degrees and a distance between the host vehicle and the remote vehicle after the second road is modified to allow the intersection angle to be about 90 degrees, and when the distance variation value is equal to or smaller than a predetermined value, the host vehicle position function and the remote vehicle position function are transformed to the transformed host vehicle position function and the transformed remote vehicle position function, respectively.

The host vehicle driving information include the position coordinates of the host vehicle, the driving direction of the host vehicle, and a speed of the host vehicle, and the remote vehicle driving information include the position coordinates of the remote vehicle, the driving direction of the remote vehicle, and a speed of the remote vehicle.

The determining of the collision possibility between the host vehicle and the remote vehicle includes calculating a time-to-collision between the host vehicle and the remote vehicle using the transformed host vehicle position function and the transformed remote vehicle position function and determining whether the time-to-collision is equal to or smaller than a predetermine collision threshold value.

Embodiments of the inventive concept provide a vehicle collision avoidance system including a communication unit receiving host vehicle driving information including position coordinates and a driving direction of a host vehicle and remote vehicle driving information including position coordinates and a driving direction of a remote vehicle, a position determination unit receiving the host vehicle driving information and the remote vehicle driving information, a collision prediction unit determining a collision possibility between the host vehicle and the remote vehicle, and a vehicle control unit controlling the host vehicle depending on the collision possibility. The position determination unit includes a position function generation module that generates a host vehicle position function and a remote vehicle position function based on the host vehicle driving information and the remote vehicle driving information and a position function transformation module that sets a transformation coordinate system with respect to the position coordinates of the host vehicle, calculates a rotation angle that is an angle between the driving direction of the host vehicle and one axis of the transformation coordinate system, and transforms the host vehicle position function and the remote vehicle position function to a transformed host vehicle position function and a transformed remote vehicle position function, respectively, using the rotation angle. The collision prediction unit determines a collision possibility between the host vehicle and the remote vehicle using the transformed host vehicle position function and the transformed remote vehicle position function.

Embodiments of the inventive concept provide a computer program stored in a computer-readable recording medium to execute the vehicle collision avoidance method in combination with a computer that is hardware.

According to the above, a vehicle position determination method that allows the position of the remote vehicle to be quickly detected is provided while driving.

When the host vehicle enters the intersection, the positions of remote vehicles entering the same intersection are instantly determined, and thus, the vehicle collision is prevented.

The possibility of collision between vehicles is accurately and quickly determined.

In addition, a computational load occurring when the vehicle collision avoidance method is performed is low.

Further, since the collision possibility is determined not through a sensor but through a data communication, the vehicle collision avoidance method is able to be applied in a none-line-of-sight (NLOS) environment.

BRIEF DESCRIPTION OF THE DRAWINGS

The above and other advantages of the present disclosure will become readily apparent by reference to the following detailed description when considered in conjunction with the accompanying drawings wherein:

FIG. 6 is a flowchart showing a vehicle collision avoidance method according to an exemplary embodiment of the present disclosure.

DETAILED DESCRIPTION

Figure 1:
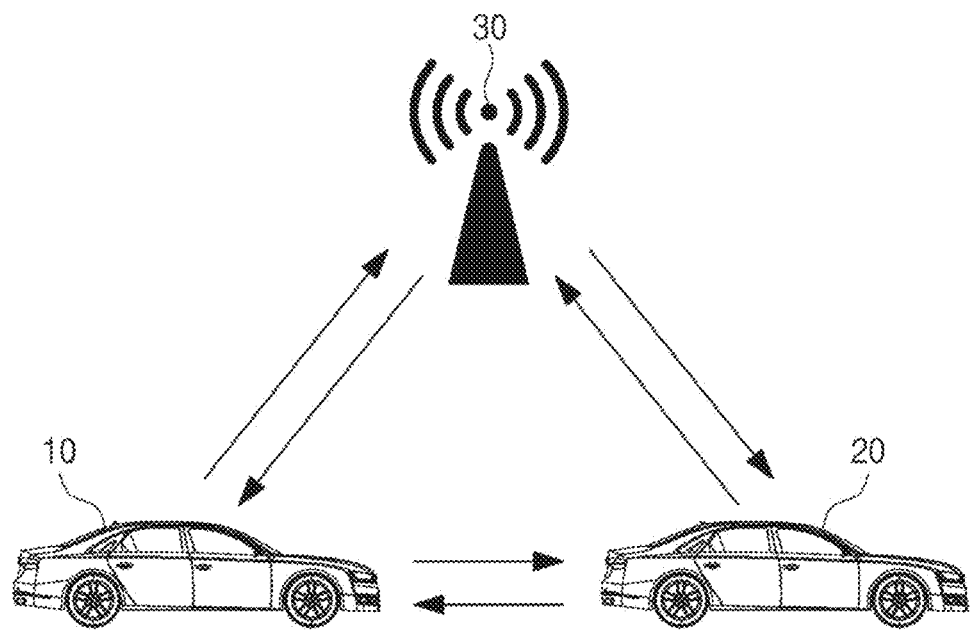
FIG. 1 is a schematic view showing a relationship between a host vehicle, a remote vehicle, and an information provision infrastructure in a vehicle collision avoidance method according to according to an exemplary embodiment of the present disclosure.

The present disclosure may be variously modified and realized in many different s, and thus spec embodiments will be exemplified in the drawings and described in detail hereinbelow. However, the present disclosure should not be limited to the specific disclosed forms, and be construed to include all modifications, equivalents, or replacements included in the spirit and scope of the present disclosure.

Hereinafter, exemplary embodiments of the present disclosure will be explained in detail with reference to the accompanying drawings.

According to an exemplary embodiment of the present disclosure, it is possible to immediately determine a location of a remote vehicle while driving without complicated calculations, and based on this, it is possible to prevent a collision between vehicles.

FIG. 1 is a schematic view showing a relationship between a host vehicle 10, a remote vehicle 20, and an information provision infrastructure 30 in a vehicle collision avoidance method according to according to an exemplary embodiment of the present disclosure.

Referring to FIG. 1, information required to perform the vehicle collision avoidance method according to the exemplary embodiment of the present disclosure may be exchanged through communications between the host vehicle 10, the remote vehicle 20, and the information provision infrastructure 30.

The host vehicle 10 may indicate a vehicle that is controlled by the vehicle collision avoidance method. There is no limit to the type of the host vehicle 10, and the host vehicle 10 may be any of various types of vehicles, such as a passenger car, a truck, a bus, a two-wheeled vehicle, and the like.

The host vehicle 10 may indicate a vehicle entering an intersection. The intersection refers to a point where two or more roads intersect, and the intersection should not be limited to the case where two roads meet vertically.

The remote vehicle 20 may indicate a vehicle driving adjacent to the host vehicle 10. In this case, the expression "the remote vehicle 20 is adjacent to the host vehicle 10" means that the remote vehicle 20 is geographically close to the host vehicle 10 and further means that the remote vehicle 20 is on a road connected to a road where the host vehicle Jo is traveling on. For example, when the host vehicle 10 is traveling on an overpass, a vehicle traveling under the overpass may not be recognized as the remote vehicle 20 since the vehicle is not traveling on the road connected to the road where the host vehicle 10 is traveling on even though the vehicle is geographically close to the host vehicle 10. In particular, the remote vehicle 20 may be a vehicle traveling adjacent to the intersection into which the host vehicle 10 enters.

The information provision infrastructure 30 may be an external server that provides at least one of traffic information, position information, and geographic information. In particular, the information provision infrastructure 30 may include a global navigation satellite system (GNSS) infrastructure that calculates and transmits position coordinates, a base station that relays traffic information, and V2I infrastructure that includes a navigation server that transmits map data.

The host vehicle 10, the remote vehicle 20, and the information provision infrastructure 30 may communicate data with each other. The data communication between the host vehicle 10, the remote vehicle 20, and the information provision infrastructure 30 may be a wireless access for vehicular environment (WAVE) technology for a vehicle-to-everything (V2X) or a cellular technology (a 5G communication technology, an LTE communication technology, a 3GPP technology, etc.).

According to the exemplary embodiment of the present disclosure, since information related to a driving of the host vehicle 10 are updated in real time through the communication between the host vehicle 10, the remote vehicle 20, and the information provision infrastructure 30, information that cause traffic accidents may be identified in advance. Accordingly, it is possible to respond promptly and flexibly to unexpected situations that occur while driving the vehicle.

In the above, the relationship between the host vehicle 10, the remote vehicle 20, and the information provision infrastructure 30 is briefly described. Hereinafter, configurations of the host vehicle 10 that performs the vehicle collision avoidance method will be described in detail.

Figure 2:
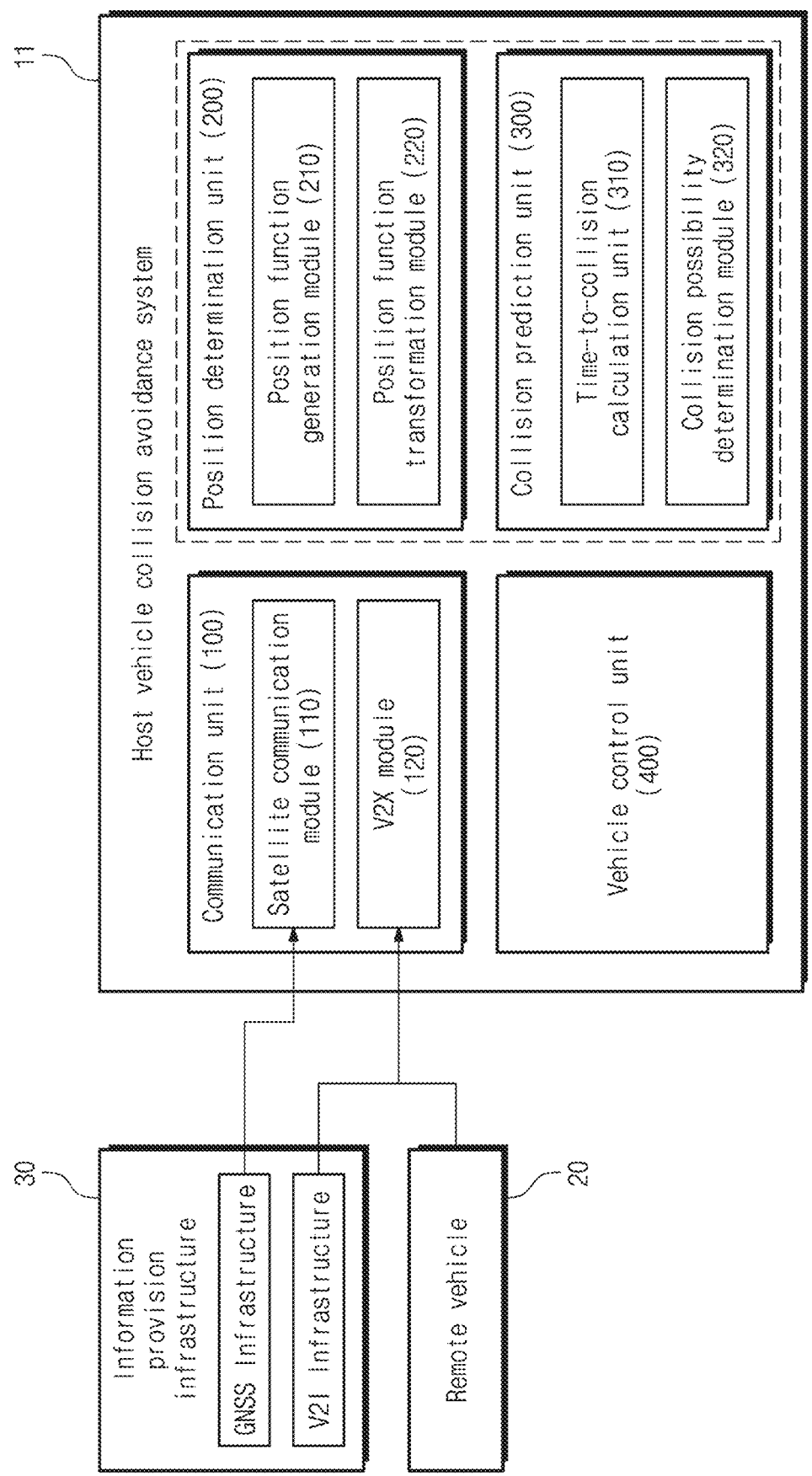
FIG. 2 is a block diagram showing a host vehicle collision avoidance system according to according to an exemplary embodiment of the present disclosure.

FIG. 2 is a block diagram showing a host vehicle collision avoidance system 11 according to an exemplary embodiment of the present disclosure.

Referring to FIG. 2, the host vehicle 10 includes the host vehicle collision avoidance system 11, and the host vehicle collision avoidance system 11 includes a communication unit 100, a position determination unit 200, a collision prediction unit 300, and a vehicle control unit 400. The host vehicle 10 may further include an engine driver, a user interface, a driving system, a brake system, and the like in addition to the host vehicle collision avoidance system II.

The communication unit 100 communicates data with other components of the remote vehicle 20, the information provision infrastructure 30, and the host vehicle 10.

The type of the data communication performed by the communication unit 100 may vary depending on a counterpart communicating with the communication unit 100. For example, in the case where the communication unit 100 communicates with other components in the host vehicle 10, an in-vehicle communication may be used. However, in the case where the communication unit 100 communicates with the remote vehicle 20 or the information provision infrastructure 30, the V2X or a long distance wireless communication may be used.

The communication unit 100 may include a satellite communication module 110 and a V2X module 120.

The satellite communication module 110 communicates with the information provision infrastructure 30 and receives satellite positioning information. In detail, the satellite communication module 110 communicates with the GNSS infrastructure of the information provision infrastructure 30 and receives host-vehicle driving information (HDI) of the host vehicle 10. In this case, the host-vehicle driving information (HDI) may include the position coordinates and a driving direction of the host vehicle 10. The position coordinates of the host vehicle 10 may be provided in the form of GPS coordinates including latitude coordinates and longitude coordinates, which are commonly used. According to an exemplary embodiment, the host-vehicle driving information (HDI) may include speed information of the host vehicle 10 to increase an accuracy of the position information of the host vehicle 10.

The satellite communication module 110 may communicate with a plurality of satellites. For example, the satellite communication module 110 may communicate with four or more satellites. Accordingly, the satellite communication module 110 may perform a triangulation with multiple combinations of satellites, and thus, the position of the host vehicle 10 to which the satellite communication module 110 is applied may be accurately determined.

The V2X module 120 may communicate with the remote vehicle 20 and receive remote-vehicle driving information (RDI) of the remote vehicle 20. For example, the V2X module 120 may communicate with the remote vehicle 20 adjacent thereto and receives position coordinates of the remote vehicle 20 and a driving direction of the remote vehicle 20. Depending on cases, the remote-vehicle driving information (RDI) may include speed information of the remote vehicle 20 to increase an accuracy of position information of the remote vehicle 20.

The V2X module 120 may communicate with the V2I infrastructure of the information provision infrastructure 30 according to circumstances to receive traffic information and map data. The traffic information and the map data provided to the V2X module 120 may include information on a shape of road, whether or not an intersection exists, and a position of the intersection.

The V2X module 120 may use a variety of wireless communication technologies, such as a code division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network in addition to the V2X communication that uses the wireless access for vehicular environment (WAVE) technology and the cellular technology, e.g., the 5G communication technology, the LTE communication technology, the 3GPP technology, etc.

The host-vehicle driving information (HDI) and the remote-vehicle driving information (RDI) provided to the communication unit 100 may be transferred to the position determination unit 200.

The position determination unit 200 determines the position of the host vehicle 10 and the position of the remote vehicle 20 based on the host-vehicle driving information (HDI) and the remote-vehicle driving information (RDI).

The position determination unit 200 may generate a position function to determine the position of the host vehicle 10 and the position of the remote vehicle 20. To this end, the position determination unit 200 may include a position function generation module 210 and a position function transformation module 220.

The position function generation module 210 generates a host vehicle position function (HPF) and a remote vehicle position function (RPF) based on the received host-vehicle driving information (HDI) and the remote-vehicle driving information (RDI).

The host vehicle position function (HPF) generated by the position function generation module 210 may include a current position and a speed vector of the host vehicle 10. In addition, the remote vehicle position function (RPF) may include a current position and a speed vector of the remote vehicle 20. For example, the host vehicle position function (HPF) may be represented by the following Equation 1, and the remote vehicle position function (RPF) may be represented by the following Equation 2.

$$\overrightarrow{HPF(x, y, t)} = (hx(t), hy(t)) = (hx_0 + v_{hx}(t), hy_0 + v_{hy}(t)) \quad \text{Equation 1}$$

In Equation 1, $hx_0$ denotes an x coordinate of the current position of the host vehicle, $hy_0$ denotes a y coordinate of the current position of the host vehicle, $v_{hx}(t)$ denotes a speed in an x direction of the host vehicle, and $v_{hy}(t)$ denotes a speed in a y direction of the host vehicle.

$$\overrightarrow{RPX(x, y, t)} = (rx(t), ry(t)) = (rx_0 + v_{rx}(t), ry_0 + v_{ry}(t)) \quad \text{Equation 2}$$

In Equation z, $rx_0$ denotes an x coordinate of the current position of the remote vehicle, $ry_0$ denotes a y coordinate of the current position of the remote vehicle, $v_{hx}(t)$ denotes a speed in an x direction of the remote vehicle, and $v_{hy}(t)$ denotes a speed in a y direction of the remote vehicle.

The position function generation module 210 may generate the host vehicle position function (HPF) and the remote vehicle position function (RPF) in a more simplified form than Equations 1 and 2, if necessary. For example, the host vehicle position function (HPF) and the remote vehicle position function (RPF) may include only the current position of the host vehicle 10 and the current position of the remote vehicle 20 except for information on the speed of the host vehicle 10 and the speed of the remote vehicle 20. As another example, the host vehicle position function (HPF) and the remote vehicle position function (RPF) may include only the current position and the driving direction of the host vehicle 10 and the remote vehicle 20 except for information on the speed of the host vehicle 10 and the remote vehicle 20. As described above, in the case where the host vehicle position function (HPF) and the remote vehicle position function (RPF) are simply configured to include only small amount of data, a computational load for performing the vehicle collision avoidance method may be greatly reduced, and the computation may be performed more quickly and frequently.

The host vehicle position function (HPF) and the remote vehicle position function (RPF) generated by the position function generation module 210 are transmitted to the position function transformation module 220.

The position function transformation module 220 transforms the host vehicle position function (HPF) and the remote vehicle position function (RPF) generated by the position function generation module 210 to a transformed host-vehicle position function (THPF) and a transformed remote-vehicle position function (TRPF).

The position function transformation module 220 may set a transformation coordinate system with respect to the current position of the host vehicle 10 before performing the transformation operation. The transformation coordinate system may be a Cartesian coordinate system constructed with the current position of the host vehicle 10 as an origin.

The position function transformation module 220 calculates a rotation angle RA that is an angle between the driving direction of the host vehicle 10 and an axis of the transformation coordinate system after setting the transformation coordinate system. In this case, the axis of the transformation coordinate system required to calculate the rotation angle RA may be determined by taking into account the speed vector of the host vehicle 10. For example, when the host vehicle 10 moves faster in a second axis direction than in a first axis direction of the transformation coordinate system, the axis of the transformation coordinate system required to calculate the rotation angle RA may be a second axis (HV Axis 2).

The position function transformation module 220 transforms the host vehicle position function (HPF) to the transformed host-vehicle position function (THPF) using the calculated rotation angle RA and transforms the remote vehicle position function (RPF) to the transformed remote-vehicle position function (TRPF) using the calculated rotation angle RA.

The transformed host-vehicle position function (THPF) and the transformed remote-vehicle position function (TRPF), which are generated by the position function transformation module 220, may have a form that allows a collision possibility of the host vehicle 10 and the remote vehicle 20 at the intersection to be easily determined. Accordingly, when using the transformed host-vehicle position function (THPF) and the transformed remote-vehicle position function (TRPF), it is possible to quickly determine the collision possibility of the host vehicle 10 and the remote vehicle 20 with a few computation. The generation of the transformed host-vehicle position function (THPF) and the transformed remote-vehicle position function (TRPF) will be described in detail later.

The transformed host-vehicle position function (THPF) and the transformed remote-vehicle position function (TRPF) generated by the position function transformation module 220 are transferred to the collision prediction unit 300.

The collision prediction unit 300 determines the collision possibility of the host vehicle 10 and the remote vehicle 20 using the transformed host-vehicle position function (THPF) and the transformed remote-vehicle position function (TRPF) provided from the position function transformation module 220.

The collision prediction unit 300 may determine the collision possibility in consideration of various factors related to the collision. For example, the collision possibility may be determined by taking into account whether or not a time-to-collision (TTC) is able to be calculated, a size of the time-to-collision (TTC), an acceleration and an acceleration increase amount of the host vehicle 10 and the remote vehicle 20.

The collision prediction unit 300 may include a time-to-collision calculation module 310 and a collision possibility determination module 320 to determine the collision possibility.

The time-to-collision calculation module 310 calculates the time-to-collision (TTC) of the host vehicle Jo and the remote vehicle 20 using the transformed host-vehicle position function (THPF) and the transformed remote-vehicle position function (TRPF). The time-to-collision (TTC) may mean, for example, the expected time required for the host vehicle 10 and the remote vehicle 20 to meet at the intersection. However, when it is determined that the host vehicle 10 and the remote vehicle 20 do not meet at the intersection by taking into account the position, the speed, and the acceleration of the host vehicle 10 and the remote vehicle 20, it may be determined that the time-to-collision (TTC) may not be calculated.

The time-to-collision (TTC) calculated by the time-to-collision calculation module 310 is transferred to the collision possibility determination module 320.

The collision possibility determination module 320 may determine the collision possibility by taking into account the factors including the time-to-collision (TTC). For example, the collision possibility determination module 320 determines whether the time-to-collision (TTC) is equal to or smaller than a predetermine collision threshold value, and when the time-to-collision (TTC) is equal to or smaller than the collision threshold value, the collision possibility determination module 320 determines that the collision possibility is high.

Different weights may be assigned to the factors considered to determine collision possibility in the collision possibility determination module 320. For example, when information that the time-to-collision (TTC) may not be calculated are provided from the time-to-collision calculation module 310, the collision possibility determination module 320 may assign high weight to the information that the time-to-collision (TTC) may not be calculated and may determine that the collision possibility is low.

The collision possibility determination module 320 may determine the collision possibility by taking into account the acceleration and the acceleration increase amount of the host vehicle 10 and the remote vehicle 20 together with the time-to-collision (TTC). For example, in a case where the acceleration increase amount of the host vehicle 10 and/or the remote vehicle 20 is large, the acceleration increase amount may be assigned with high weight since there is a high possibility that the host vehicle 10 and/or the remote vehicle 20 are/is accelerating rapidly. Accordingly, even though the time-to-collision (TTC) is the same, it may be determined that the collision possibility is high when the acceleration increase amount is large.

The determination of the collision possibility performed in the collision possibility determination module 320 may be performed in a predetermined period. In this case, the determination period of the collision possibility may vary depending on the form of the transformed host-vehicle position function (THPF) and the transformed remote-vehicle position function (TRPF). For example, in the case where the transformed host-vehicle position function (THPF) and the transformed remote-vehicle position function (TRPF) include only the position coordinates of the host vehicle 10 and the remote vehicle 20, the determination period of the collision possibility may be relatively short. On the contrary, in the case where the transformed host-vehicle position function (THPF) and the transformed remote-vehicle position function (TRPF) include both the position coordinates and the speed vector of the host vehicle 10 and the remote vehicle 20, the determination period of the collision possibility may be relatively long.

The collision possibility determination module 320 may determine the collision possibility in the manner of storing the transformed host-vehicle position function (THPF) and the transformed remote-vehicle position function (TRPF) in a cache memory after the determination of the collision possibility and reflecting information updated every predetermined period. Accordingly, although the transformed host-vehicle position function (THPF) and the transformed remote-vehicle position function (TRPF) include both the position coordinates and the speed vector of the host vehicle 10 and the remote vehicle 20, the computational load applied to the collision possibility determination module 320 is not large.

The collision possibility determination module 320 may determine whether to transmit an operation signal to the vehicle control unit 400 according to the determined collision possibility. When the determined collision possibility is equal to or greater than a predetermined value, the collision possibility determination module 320 transmits the operation signal to the vehicle control unit 400.

The vehicle control unit 400 transmits a vehicle control signal to other components of the host vehicle 10, such as a vehicle's interface, the driving system, the brake system, etc., when receiving the operation signal from the collision possibility determination module 320.

Operations, such as a driver alarm, a vehicle deceleration, a vehicle stop, etc., may be performed by the vehicle control signal provided from the vehicle control unit 400. In this case, which vehicle control signal the vehicle control unit 400 transmits may depend on the operation signal provided from the collision possibility determination module 320, and the operation signal may vary depending on the size of the determined collision possibility. For example, in a case where the collision possibility is in a specific range, the vehicle control unit 400 may receive only the operation signal to give a warning alarm to a driver of the host vehicle 10. However, in a case where the collision possibility is greater than the specific range, the vehicle control unit 400 may receive the operation signal to decelerate the host vehicle 10.

As the vehicle control unit 400 controls the vehicle based on the collision possibility, a collision accident between the host vehicle 10 and the remote vehicle 20 may be prevented.

According to the exemplary embodiment of the present disclosure, the transformed host-vehicle position function (THPF) and the transformed remote-vehicle position function (TRPF) may be generated based on the host-vehicle driving information (HDI) and the remote-vehicle driving information (RDI), and based on this, the collision possibility between the host vehicle 10 and the remote vehicle 20 may be determined. Since the transformed host-vehicle position function (THPF) and the transformed remote-vehicle position function (TRPF) have the form that allows the collision possibility to be easily determined, the computational load caused by determining the collision possibility may be significantly lowered. Accordingly, the collision possibility may be quickly determined, and a vehicle collision avoidance effect may be improved.

In the above descriptions, the components of the host vehicle 10 that performs the vehicle collision avoidance method according to the exemplary embodiment of the present disclosure is described. Hereinafter, other components used to perform the vehicle collision avoidance method will be described.

Figure 3:
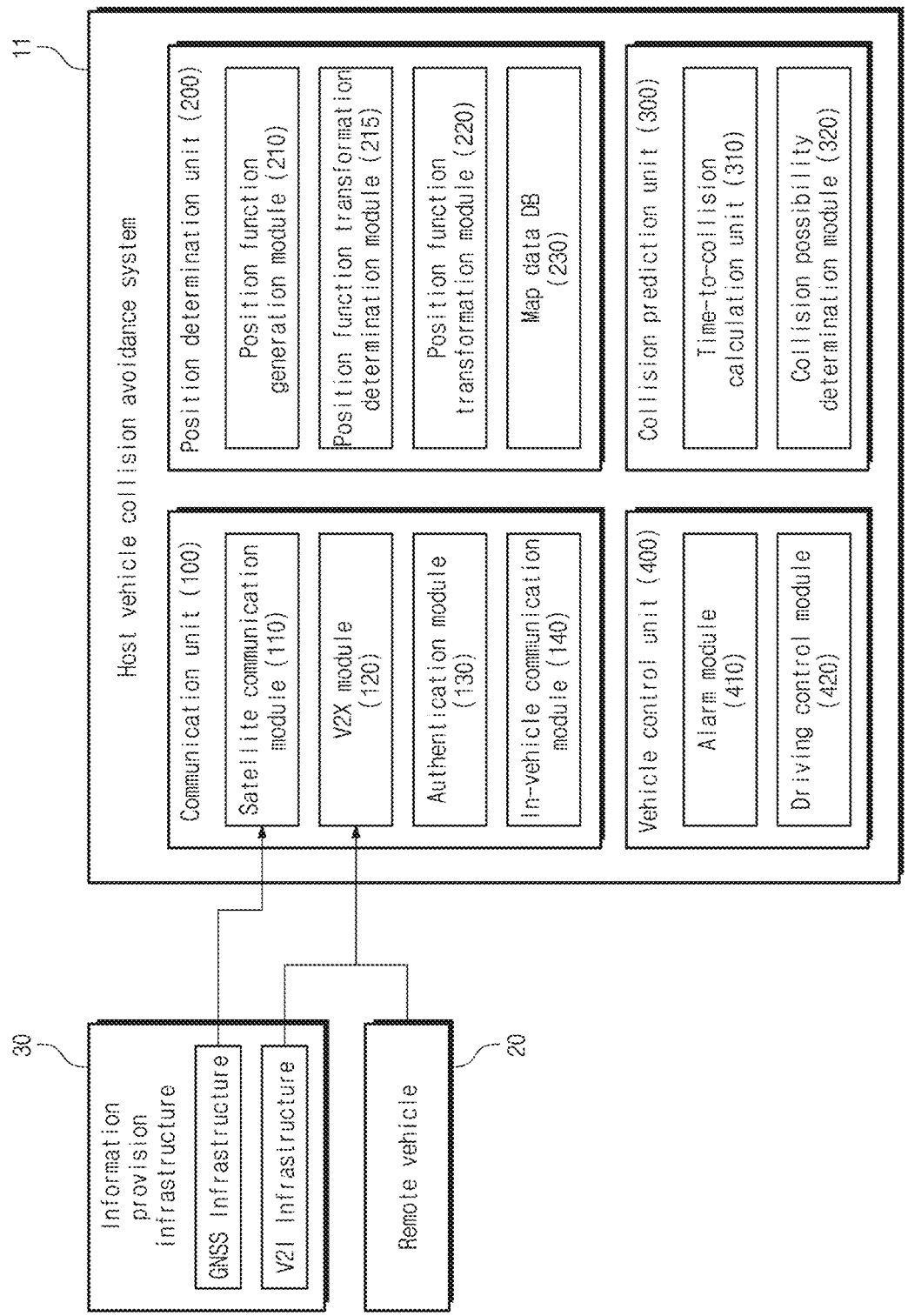
FIG. 3 is a block diagram showing a host vehicle collision avoidance system according to according to an exemplary embodiment of the present disclosure.

FIG. 3 is a block diagram showing a host vehicle collision avoidance system according to according to an exemplary embodiment of the present disclosure.

Referring to FIG. 3, a communication unit 100 further includes an authentication module 130 and an in-vehicle communication module 140.

The authentication module 130 verifies authentication information of the remote vehicle 20 and the information provision infrastructure 30, which communicate with the host vehicle 10. The authentication module 130 may use an encryption and decryption key management system (KMS)

or a public key infrastructure to identify whether the remote vehicle 20 and the information provision infrastructure 30 are suitable senders.

In a case where the authentication information of the remote vehicle 20 or the information provision infrastructure 30 are not verified in the authentication module 130, the authentication module 130 may discard the information provided from the remote vehicle 20 or the information provision infrastructure 30. In addition, unauthenticated information continues to be provided from the same address, the authentication module 130 may block the address so that no information are provided from the address.

The in-vehicle communication module 140 may collect information generated in the host vehicle 10. The in-vehicle communication module 140 may perform an in-vehicle communication, for example, using a controller area network (CAN), a local interconnect network (LIN), an I-BUS, a Bluetooth, or the like. The information, which are provided from the in-vehicle communication module 140, on the host vehicle 10 may be merged with the host-vehicle driving information (HDI) provided to the satellite communication module 110. Accordingly, the accuracy of the host-vehicle driving information (HDI) may be more improved. In addition, since the host-vehicle driving information (HDI) are supplemented even in areas where the satellite communication module 110 is difficult to communicate with satellites, such as under a bridge or inside a tunnel, the accuracy of the host-vehicle driving information (HDI) may be improved.

The position determination unit 200 may further include a position function transformation determination module 215 and a map data DB 230.

The position function transformation determination module 215 determines whether to transform the host vehicle position function (HPF) and the remote vehicle position function (RPF) generated by the position function generation module 210 to the transformed host-vehicle position function (THPF) and the transformed remote-vehicle position function (TRPF), respectively.

The position function transformation determination module 215 does not transform the host vehicle position function (HPF) and the remote vehicle position function (RPF) to the transformed host-vehicle position function (THPF) and the transformed remote-vehicle position function (TRPF) when it is deviated from a predetermined reference. Accordingly, unnecessary position function transformation may be prevented from being performed, and the computational load in the position function transformation module may be reduced.

The map data DB 230 stores map data. The map data may include intersection information, road information, and the like. The map data stored in the map data DB 230 may be transmitted to the time-to-collision calculation module, the position function transformation determination module 215, and the like, as needed.

The map data stored in the map data DB 230 may be continuously updated based on the map information provided from the information provision infrastructure 30.

The vehicle control unit 400 may include an alarm module 410 and a driving control module 420.

The alarm module 410 may be provided in an infotainment area. The alarm module 410 may generate a vehicle control signal to sound a horn at or to irradiate a flashing flashlight to the driver of the host vehicle 10.

The driving control module 420 may be provided in a safety area. The driving control module 420 may generate a driving control signal to decelerate or stop the host vehicle 10.

According to the exemplary embodiment of the present disclosure, as the host vehicle 10 includes the authentication module 130, the position function transformation determination module 215, and the like, security may be improved and the computational load may be reduced in performing the vehicle collision avoidance method.

In the above descriptions, the components of the host vehicle 10 are described. Hereinafter, the transformation of the host vehicle position function (HPF) and the remote vehicle position function (RPF), which is performed in the position function transformation module 220, will be described in detail.

Figure 4A:
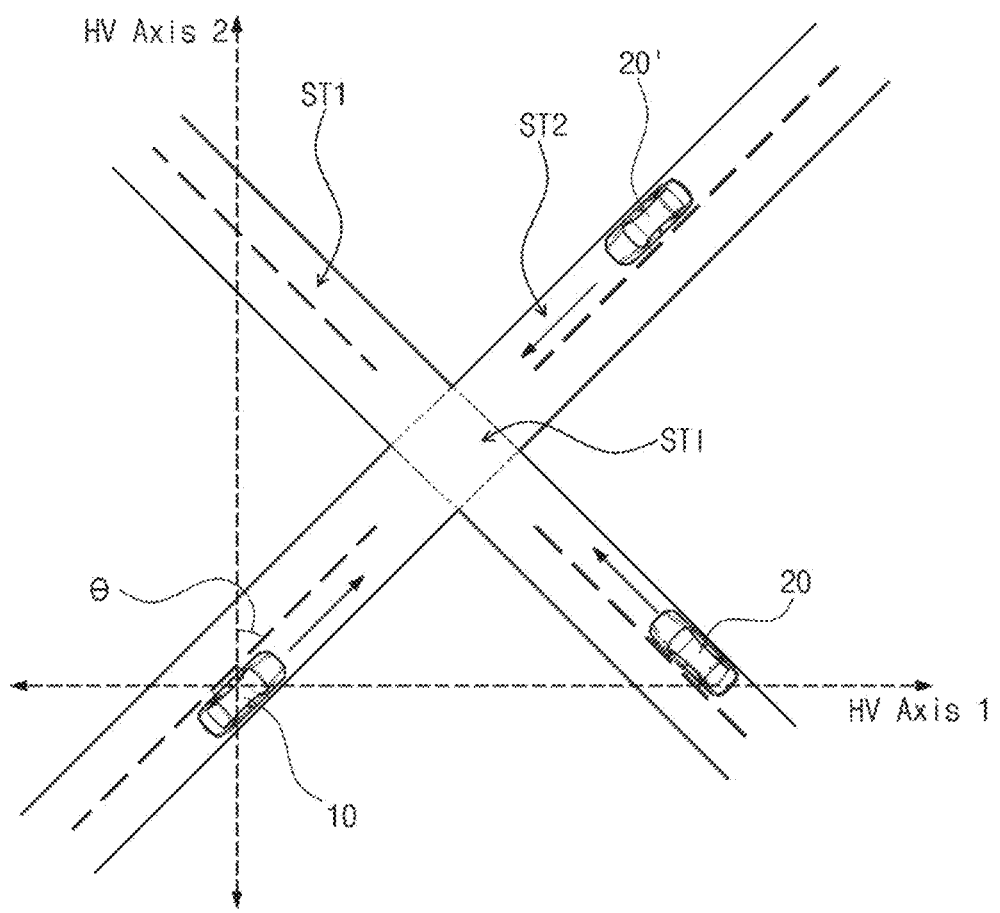
FIGS. 4A and 4B are views showing before and after transformation of a host vehicle position function and a remote vehicle position function according to a vehicle collision avoidance method according to an exemplary embodiment of the present disclosure.
Figure 4B:
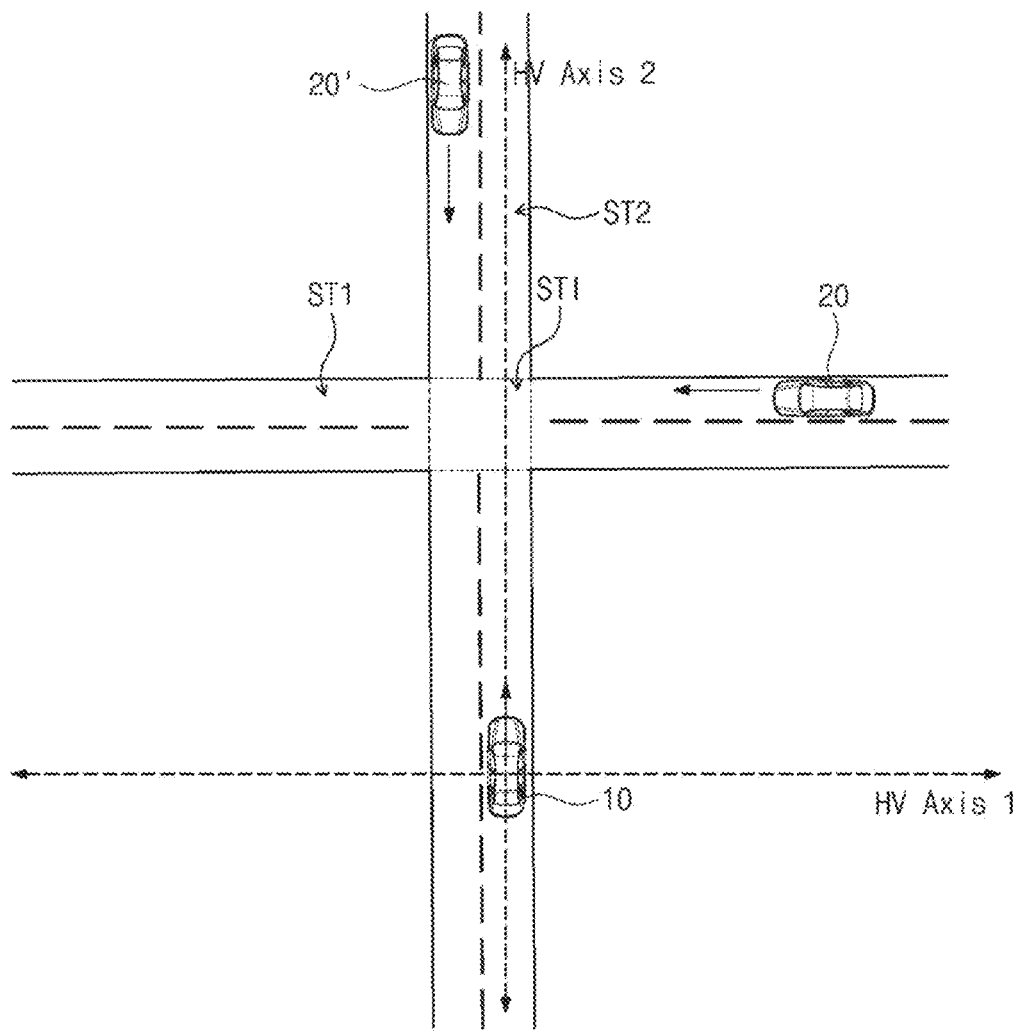

FIGS. 4A and 4B are views showing before and after the transformation of the host vehicle position function and the remote vehicle position function according to the vehicle collision avoidance method according to an exemplary embodiment of the present disclosure.

Referring to FIG. 4A, the host vehicle 10, a first remote vehicle 20, and a second remote vehicle 20' enter an intersection STI along a first road ST1 and a second road ST2.

Since the first road ST1 and the second road ST2 are substantially perpendicular to each other, the host vehicle 10 driving the first road ST1 is difficult to visually recognize the first remote vehicle 20 until the host vehicle 10 enters the intersection STI. Accordingly, there is a high risk of collision between the host vehicle 10 and the first remote vehicle 20 at the intersection STI.

According to a conventional technology, routes of the first and second remote vehicles 20 and 20' are predicted based on received GPS data to prevent the collision between the host vehicle 10 and the first and second remote vehicles 20 and 20'. However, for predicting the routes of the first and second remote vehicles 20 and 20', it is necessary to receive a plurality of time-series GPS data and to perform a complex operation for predicting the routes based on the received GPS data. These multiple data reception and complex operations cause many problems because they require a relatively long time. In particular, when the host vehicle 10 is driving at high speed, the possibility of not preventing accidents is high as a data processing time increases.

According to the exemplary embodiment of the present disclosure, the host vehicle 10 may quickly determine a position of the first remote vehicle 20 and a position of the second remote vehicle 20' using the transformed host-vehicle position function (THPF) and the transformed remote-vehicle position function (TRPF).

For the position function transformation, the position function transformation module sets the transformation coordinate system based on the position coordinates of the host vehicle 10. As described above, the transformation coordinate system may be the Cartesian coordinate system and may be set to allow the host vehicle 10 to be positioned at an origin of the coordinate system. The transformation coordinate system includes a transformation coordinate system first axis (HV Axis 1) and a transformation coordinate system second axis (HV Axis 2). The transformation coordinate system first axis (HV Axis 1) and the transformation coordinate system second axis (HV Axis 2) are substantially perpendicular to each other at the origin at which the host vehicle 10 is positioned.

After the transformation coordinate system is set, the position function transformation module calculates the rotation angle RA that is an angle ($\theta$) between the driving direction of the host vehicle 10 or an extension direction of the second road ST2 on which the host vehicle 10 is driving and the transformation coordinate system second axis (HV Axis 2). However, the rotation angle RA may be an angle ($\theta$)

between the extension direction of the second road ST2 and the transformation coordinate system first axis (HV Axis 1).

As shown in FIG. 4B, the position function transformation module transforms the host vehicle position function (HPF) and the remote vehicle position function (RPF) to the transformed host-vehicle position function (THPF) and the transformed remote-vehicle position function (TRPF), respectively using the rotation angle RA. In addition, the map data in which the first road ST1, the second road ST2, and the intersection STI are displayed may also be converted.

The position function transformation module may rotate the host vehicle position function (HPF) and the remote vehicle position function (RPF) by the rotation angle RA with respect to the origin at which the host vehicle 10 is positioned, and thus, may perform the position function transformation.

For example, the above position function transformation may be performed by the following Equation 3.

$$\begin{pmatrix} rx'(t) \\ ry'(t) \end{pmatrix} = \begin{pmatrix} \cos\theta & -\sin\theta \\ \sin\theta & \cos\theta \end{pmatrix} \begin{pmatrix} rx(t) \\ ry(t) \end{pmatrix} \quad \text{Equation 3}$$

In Equation 3, rx'(t) and ry'(t) denote the transformed remote-vehicle position function (TRPF), rx(t) and ry(t) denote the remote vehicle position function (RPF), and θ denotes the rotation angle RA.

After the position function transformation, the first remote vehicle 20 and the second remote vehicle 20' may be positioned on a straight line substantially parallel to one of the transformation coordinate system first axis (HV Axis 1) or the transformation coordinate system second axis (HV Axis 2). For example, referring to FIGS. 4A and 4B, the first remote vehicle 20 is positioned on the straight line substantially parallel to the first axis (HV Axis 1), and the second remote vehicle 20' is positioned on the straight line substantially parallel to the transformation coordinate system second axis (HV Axis 2).

A driving direction value included in the transformed host-vehicle position function (THPF) and the transformed remote-vehicle position function (TRPF), which are generated after the position function transformation, includes only one of the first axis (HV Axis 1) and the second axis (HV Axis 2). Accordingly, the time-to-collision (TTC) at the intersection STI may be easily computed, and the computational load may be reduced.

According to the exemplary embodiment of the present disclosure, the position of the first remote vehicle 20 and the position of the second remote vehicle 20' may be determined without performing the complex operation and receiving multiple time-series data. In addition, as the position function transformation is performed, the position of the first remote vehicle 20 and the position of the second remote vehicle 20' with respect to the host vehicle 10 may be immediately determined, and the computational load caused by the calculation of the time-to-collision may be reduced. Accordingly, the positions of the remote vehicles 20 and 20' may be immediately identified, and the accidents may also be prevented.

Figure 5A:
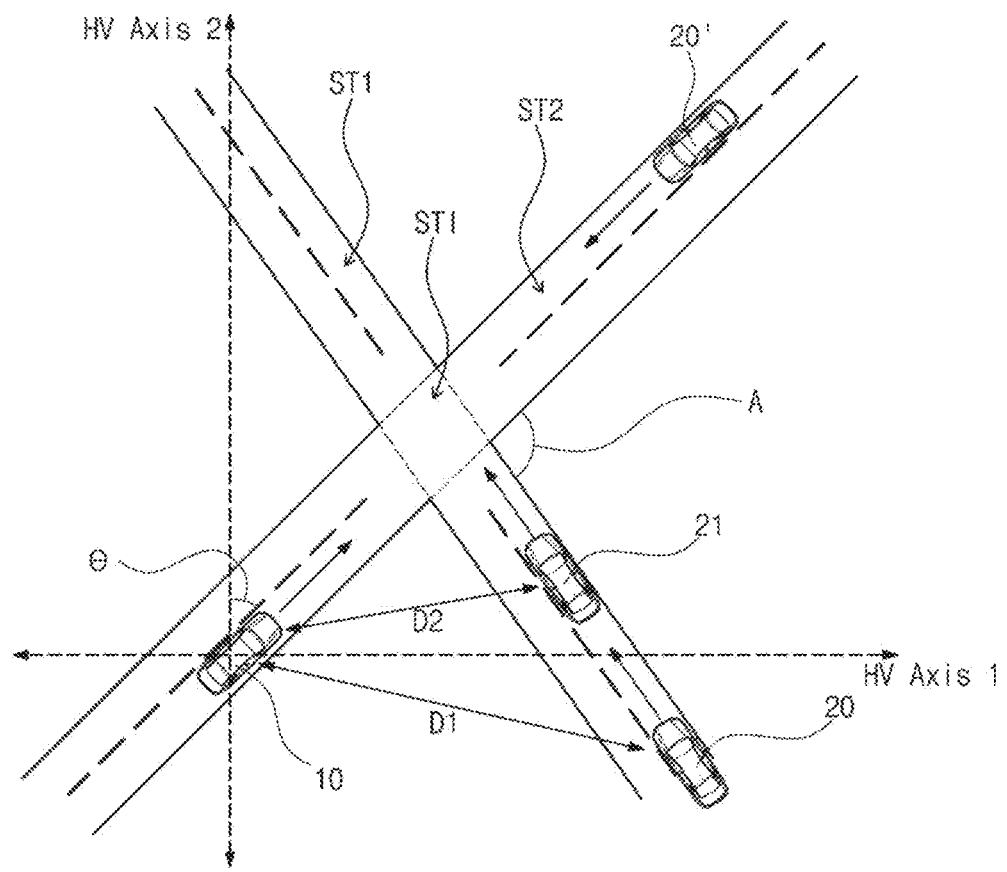
FIGS. 5A and 5B are views showing before and after transformation of a host vehicle position function and a remote vehicle position function according to a vehicle collision avoidance method according to an exemplary embodiment of the present disclosure.
Figure 5B:
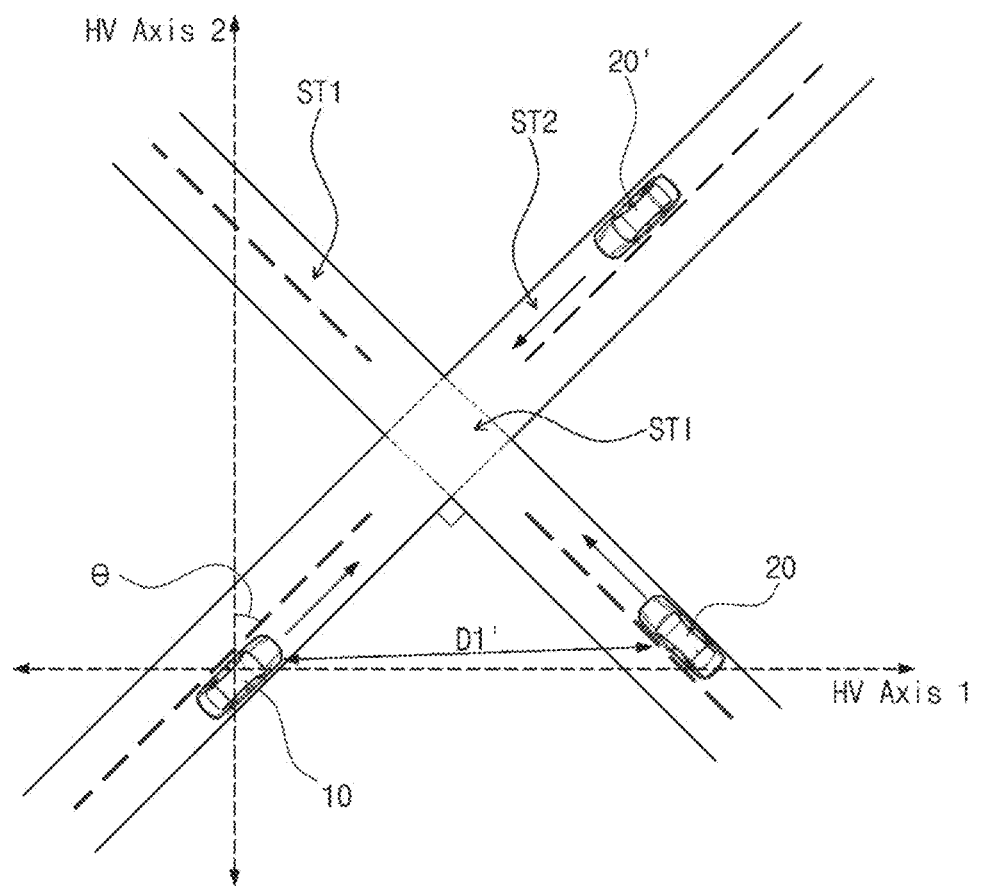

FIGS. 5A and 5B are views showing before and after the transformation of the host vehicle position function and the remote vehicle position function according to the vehicle collision avoidance method according to an exemplary embodiment of the present disclosure.

According to the exemplary embodiment of the present disclosure, the position function transformation determination module of the host vehicle 10 may determine whether to perform the position function transformation on the host vehicle position function (HPF) and the remote vehicle position function (RPF). Hereinafter, a process of determining the position function transformation will be described in more detail.

Referring to FIG. 5A, it is determined whether an intersection angle A between the first road ST1 and the second road ST2 at the intersection STI is within an effective intersection range to determine whether to perform the position function transformation on the host vehicle 10 and the first remote vehicle 20, which approach the intersection STI.

The intersection angle A may be measured from the traffic information provided from the information provision infrastructure or the map data provided from the map data DB. The effective intersection range may be around 90 degrees.

The position function transformation determination module determines to perform the position function transformation when the intersection angle A is within the effective intersection range. When the intersection angle A is out of the effective intersection range, the position function transformation is not performed since errors due to the position function transformation occur and the accuracy of the determination on the collision possibility is lowered. Accordingly, the computational load caused by performing the unnecessary position function transformation may be reduced.

In a case where the intersection angle A is within the effective intersection range but not 90 degrees, a process of modifying the first road ST1 or the second road ST2 on the map data may be performed such that the first road ST1 and the second road ST2 are substantially perpendicular to each other before the position function transformation is performed. In this case, the map data are temporarily modified, and the map data stored in the map data DB are not modified. As the first road ST1 and the second road ST2 are modified to be substantially perpendicular to each other, the transformed host-vehicle position function (THPF) and the transformed remote-vehicle position function (TRPF) may have the speed vector with respect to only one of the first axis HV Axis 1 and the second axis HV Axis 2.

Although the intersection angle A is out of the effective intersection range, a distance between the host vehicle 10 and the remote vehicle 20 is calculated, and when the distance between the host vehicle 10 and the remote vehicle 20 is equal to or smaller than a predetermined value, the position function transformation determination module determines to perform the position function transformation. For example, as shown in FIG. 5A, the position function transformation may not be performed on the host vehicle 10 and the first remote vehicle 20 that is spaced apart from the host vehicle 10 by a distance D1 greater than the predetermined value. However, the position function transformation may be performed on a third remote vehicle 21 that is spaced apart from the host vehicle 10 by a distance D2 smaller than the predetermined value even though the third remote vehicle 21 is positioned on the same first road ST1.

When the distance between the host vehicle 10 and the remote vehicle 20 is equal to or smaller than the predetermined value, the collision possibility between the host vehicle 10 and the remote vehicle 20 is high, and an error caused by modifying the first axis HV Axis 1 and the second axis HV Axis 2 to be perpendicular to each other, which are not perpendicular to each other, is not large. Therefore, although the intersection angle A is out of the effective intersection range, there is no problem on the map data modification and the position function transformation.

When it is difficult to obtain the intersection angle A at the intersection STI, whether to perform the map data modification and the position function transformation may be determined based on the distance between the host vehicle 10 and the remote vehicle 20.

In detail, a distance variation value D1-D1', which is a difference between the distance D1 between the host vehicle and the remote vehicle before the second road is modified to allow the intersection angle to be about 90 degrees and a distance D1' between the host vehicle and the remote vehicle after the second road is modified to allow the intersection angle to be about 90 degrees, may be obtained, and when the distance variation value D1-D1' is equal to or smaller than the predetermined value, the map data modification and the position function transformation may be performed. Accordingly, even though the map data are not complete, the vehicle collision avoidance method may be performed.

According to the exemplary embodiment of the present disclosure, when the roads crossing each other at the intersection STI are not perpendicular to each other, whether to perform the position function transformation may be determined depending on the intersection angle. Accordingly, the accuracy of the collision possibility calculated after the position function transformation may be more improved.

FIG. 6 is a flowchart showing the vehicle collision avoidance method according to an exemplary embodiment of the present disclosure.

Referring to FIG. 6, the host-vehicle driving information (HDI) are received (S100). The host-vehicle driving information (HDI) may include the position coordinates and the driving direction of the host vehicle. The host-vehicle driving information (HDI) may be the satellite positioning value provided from the GNSS infrastructure of the information provision infrastructure.

Then, the remote-vehicle driving information (RDI) are received (S200). The remote-vehicle driving information (RDI) may include the position coordinates and the driving direction of the remote vehicle. The remote-vehicle driving information (RDI) may be provided from the remote vehicle through the V2X communication.

After that, the host vehicle position function (HPF) may be generated based on the host-vehicle driving information (HDI), and the remote vehicle position function (RPF) may be generated based on the remote-vehicle driving information (RDI) (S300).

Next, the transformation coordinate system may be formed with respect to the host vehicle position coordinates (S400). The position of the host vehicle may be set as the origin in the transformation coordinate system.

Then, the rotation angle RA is calculated (S500). The rotation angle RA may be the angle between the driving direction of the host vehicle and one axis of the transformation coordinate system.

The host vehicle position function (HPF) and the remote vehicle position function (RPF) are transformed using the rotation angle RA (S700). As the host vehicle position function (HPF) and the remote vehicle position function (RPF) are rotated by the rotation angle RA with respect to the position of the host vehicle, the transformed host-vehicle position function (THPF) and the transformed remote-vehicle position function (TRPF) may be generated.

Then, the collision possibility between the host vehicle and the remote vehicle is evaluated (S700). The evaluation of the collision possibility may be performed by taking into account various factors including the time-to-collision (TTC) between the host vehicle and the remote vehicle.

Next, the host vehicle is controlled (S800). When the collision possibility between the host vehicle and the remote vehicle is equal to or greater than a specific level, the vehicle control may be performed by giving the alarm to the driver of the host vehicle or decelerating the host vehicle.

Figure 7:
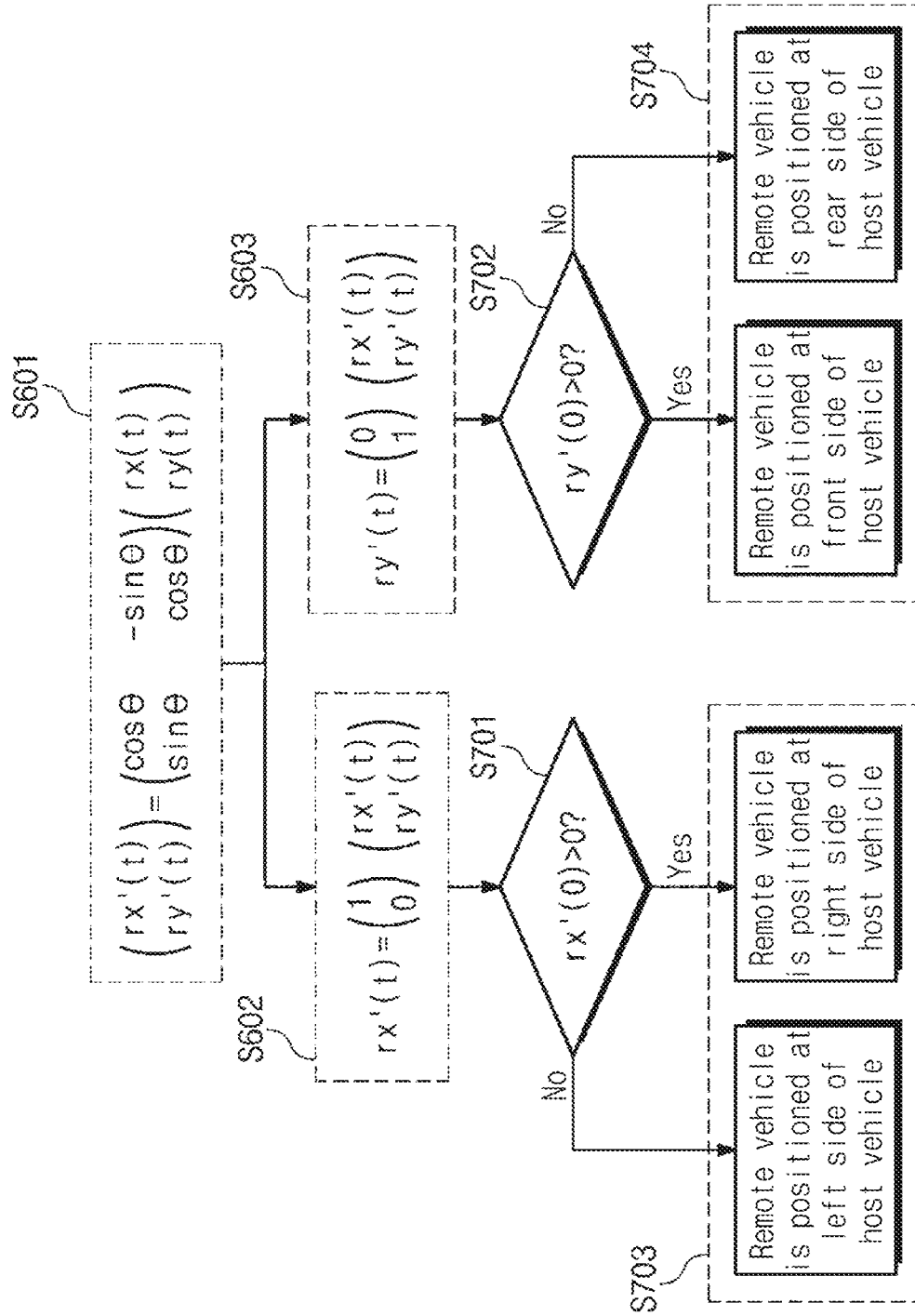
FIG. 7 is a flowchart showing a method of determining a position of a remote vehicle with respect to a host vehicle according to an exemplary embodiment of the present disclosure.

FIG. 7 is a flowchart showing a method of determining the position of the remote vehicle with respect to the host vehicle according to an exemplary embodiment of the present disclosure.

The position determination unit may perform an operation shown in FIG. 7 to transform the remote vehicle position function (RPF) (S601). In FIG. 7, rx'(t) and ry'(t) denote the affine transformed remote-vehicle position function (TRPF), and rx(t) and ry(t) denote the remote vehicle position function (RPF).

The position determination unit may determine a first axis component and a second axis component of the transformed remote-vehicle position function (TRPF) separately after the position function transformation. Accordingly, a matrix operation may be performed to leave only the first axis component and the second axis component, respectively (S602, and S603).

The position determination unit determines the current (t=0) position coordinates of the remote vehicle after the operation (S701 and S702). When rx'(0) is greater than zero (0), the position determination unit determines that the remote vehicle is positioned at a right side of the host vehicle (S703). When rx'(0) is smaller than zero (0), the position determination unit determines that the remote vehicle is positioned at a left side of the host vehicle (S703). In the case of the second axis component, when ry'(0) is greater than zero (0), the position determination unit determines that the remote vehicle is positioned at a front side of the host vehicle (S704). When ry'(0) is smaller than zero (0), the position determination unit determines that the remote vehicle is positioned at a rear side of the host vehicle (S704).

As described above, the relative position of the remote vehicle with respect to the host vehicle may be determined by only a sign of the first axis component and the second axis component of the current position coordinates of the remote vehicle. Accordingly, the position of the remote vehicle may be quickly determined even with a few computational load.

The above-described determination process may be performed considering the driving direction of the host vehicle and the driving direction of the remote vehicle. For example, when the first axis component of the relative driving direction of the remote vehicle to the host vehicle has a positive value, it is determined that the remote vehicle is proceeding to the right with respect to the host vehicle. On the contrary, when the first axis component of the relative driving direction of the remote vehicle to the host vehicle has a negative value, it is determined that the remote vehicle is proceeding to the left with respect to the host vehicle. In the case of the second axis component, when the second axis component has a positive value, it is determined that the remote vehicle is proceeding to the same direction as the host vehicle, and when the second axis component has a negative value, it is determined that the remote vehicle and the host vehicle are facing each other and proceeding in a direction approaching each other.

As described above, the relative position and the driving direction of the host vehicle and the remote vehicle may be determined without a speed scalar value, and the collision between the host vehicle and the remote vehicle may be prevented. Thus, the vehicle collision avoidance method may be performed quickly.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A vehicle collision avoidance method comprising:
receiving host vehicle driving information comprising position coordinates and a driving direction of a host vehicle;
receiving remote vehicle driving information comprising position coordinates and a driving direction of a remote vehicle;
generating a host vehicle position function and a remote vehicle position function based on the host vehicle driving information and the remote vehicle driving information;
setting a transformation coordinate system with respect to the position coordinates of the host vehicle;
calculating a rotation angle that is an angle between the driving direction of the host vehicle and one axis of the transformation coordinate system;
transforming the host vehicle position function and the remote vehicle position function to a transformed host vehicle position function and a transformed remote vehicle position function, respectively, using the rotation angle;
determining a collision possibility between the host vehicle and the remote vehicle using the transformed host vehicle position function and the transformed remote vehicle position function; and
controlling the host vehicle depending on the collision possibility.

2. The vehicle collision avoidance method of claim 1, wherein the transformed host vehicle position function and the transformed remote vehicle position function are generated by rotating the host vehicle position function and the remote vehicle position function by the rotation angle based on a position of the host vehicle as an origin.

3. The vehicle collision avoidance method of claim 1, wherein the host vehicle and the remote vehicle are vehicles approaching an intersection, the intersection comprises a first road on which the host vehicle drives and a second road on which the remote vehicle drives, and the vehicle collision avoidance method comprises:
determining whether an intersection angle of the first road and the second road is within an effective intersection range; and
transforming the remote vehicle position function and the host vehicle position function to the transformed remote vehicle position function and the transformed host vehicle position function, respectively, when the intersection angle is within the effective intersection range.

4. The vehicle collision avoidance method of claim 3, further comprising modifying the second road such that the first road is substantially perpendicular to the second road when the intersection angle is within the effective intersection range before the transforming of the remote vehicle position function to the transformed remote vehicle position function.

5. The vehicle collision avoidance method of claim 3, wherein, when a distance between the host vehicle and the remote vehicle is equal to or smaller than a predetermined value, the remote vehicle position function and the host vehicle position function are transformed to the transformed remote vehicle position function and the transformed host vehicle position function, respectively, even though the intersection angle is out of the effective intersection range.

6. The vehicle collision avoidance method of claim 1, wherein the host vehicle and the remote vehicle are vehicles approaching an intersection, the intersection comprises a first road on which the host vehicle drives and a second road on which the remote vehicle drives,
wherein the vehicle collision avoidance method further comprises,
modifying the second road to allow an intersection angle between the first road and the second road to be about 90 degrees, and
obtaining a distance variation value that is a difference between a distance between the host vehicle and the remote vehicle before the second road is modified to allow the intersection angle to be about 90 degrees and a distance between the host vehicle and the remote vehicle after the second road is modified to allow the intersection angle to be about 90 degrees, and
wherein when the distance variation value is equal to or smaller than a predetermined value, the host vehicle position function and the remote vehicle position function are transformed to the transformed host vehicle position function and the transformed remote vehicle position function, respectively.

7. The vehicle collision avoidance method of claim 1, wherein the host vehicle driving information comprise the position coordinates of the host vehicle, the driving direction of the host vehicle, and a speed of the host vehicle, and
wherein the remote vehicle driving information comprise the position coordinates of the remote vehicle, the driving direction of the remote vehicle, and a speed of the remote vehicle.

8. The vehicle collision avoidance method of claim 1, wherein the determining of the collision possibility between the host vehicle and the remote vehicle comprises:
calculating a time-to-collision between the host vehicle and the remote vehicle using the transformed host vehicle position function and the transformed remote vehicle position function; and
determining whether the time-to-collision is equal to or smaller than a predetermined collision threshold value.

9. A vehicle collision avoidance system comprising:
a computer configured to,
receive host vehicle driving information comprising position coordinates and a driving direction of a host vehicle and remote vehicle driving information comprising position coordinates and a driving direction of a remote vehicle,
receive the host vehicle driving information and the remote vehicle driving information,
generate a host vehicle position function and a remote vehicle position function based on the host vehicle driving information and the remote vehicle driving information,
set a transformation coordinate system with respect to the position coordinates of the host vehicle, calculate a rotation angle that is an angle between the driving direction of the host vehicle and one axis of the transformation coordinate system, transform the host vehicle position function and the remote vehicle position function to a transformed host vehicle position function and a transformed remote vehicle position function, respectively, using the rotation angle, determine a collision possibility between the host vehicle and the remote vehicle using the transformed host vehicle position function and the transformed remote vehicle position function; and control the host vehicle depending on the collision possibility.

10. A non-transitory computer readable medium storing a computer program, which when executed by a computer causes the computer to perform the method of claim 1.

* * * * *